US008668965B2

(12) United States Patent
Kasperchik et al.

(10) Patent No.: US 8,668,965 B2
(45) Date of Patent: Mar. 11, 2014

(54) PRINTED ARTICLE WITH METALLIC APPEARANCE

(75) Inventors: Vladek Kasperchik, Corvallis, OR (US); Glenn T Gentile, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 468 days.

(21) Appl. No.: 13/173,065

(22) Filed: Jun. 30, 2011

(65) Prior Publication Data

US 2012/0098248 A1 Apr. 26, 2012

Related U.S. Application Data

(63) Continuation-in-part of application No. PCT/US2010/053695, filed on Oct. 22, 2010, and a continuation-in-part of application No. PCT/US2010/053699, filed on Oct. 22, 2010.

(51) Int. Cl.

| | |
|---|---|
| ***B41M 5/50*** | (2006.01) |
| ***B42D 15/00*** | (2006.01) |
| ***C09D 11/00*** | (2006.01) |

(52) U.S. Cl.

USPC ..................... 428/32.32; 106/31.65; 106/31.9

(58) Field of Classification Search

CPC ........ B41M 5/50; B41M 5/508; B42D 15/00; C09D 11/00; C09D 11/322

USPC ............................ 428/32.32; 106/31.65, 31.9

See application file for complete search history.

(56) References Cited

U.S. PATENT DOCUMENTS

| | | | | |
|---|---|---|---|---|
| 4,358,779 | A | 11/1982 | Hohn et al. | |
| 6,685,999 | B2 * | 2/2004 | Ichinose et al. | 428/32.25 |
| 7,615,111 | B2 | 11/2009 | Oriakhi | |
| 2003/0186020 | A1 | 10/2003 | Kasahara | |
| 2004/0109958 | A1 | 6/2004 | Nigam et al. | |
| 2007/0022901 | A1 | 2/2007 | Kurze et al. | |
| 2007/0034112 | A1 | 2/2007 | Mronga et al. | |
| 2007/0076069 | A1 | 4/2007 | Edwards et al. | |
| 2007/0281177 | A1 | 12/2007 | Haubrich et al. | |
| 2009/0053415 | A1 | 2/2009 | Isobe | |
| 2009/0294080 | A1 | 12/2009 | Honnorat | |
| 2010/0005601 | A1 | 1/2010 | Kantor | |
| 2010/0151047 | A1 | 6/2010 | Pfaff et al. | |
| 2010/0279078 | A1 | 11/2010 | Pan et al. | |

FOREIGN PATENT DOCUMENTS

JP 2005/280093 10/2005

OTHER PUBLICATIONS

International Search Report and Written Opinion for S.N. PCT/US2010/053699 dated Jul. 7, 2011 (9 pages).

International Search Report and Written Opinion for S.N. PCT/US2010/053695 dated Jun. 30, 2011 (10 pages).

* cited by examiner

*Primary Examiner* — Bruce H Hess

(57) ABSTRACT

A printed article with metallic appearance that includes a printable media on which a printed feature is formed with an ink composition. Said ink composition contains a dispersion of metal or metal oxide particles having an average particle size in the range of about 3 to about 180 nm. The media is a textured printable media containing a supporting substrate and an ink-absorbing layer with pore diameters that are smaller than the size of the metal or metal oxide particles. Said ink composition forms, onto the textured printable media, a printed feature that exhibits a metallic appearance.

15 Claims, 3 Drawing Sheets

PRINTED ARTICLE WITH METALLIC APPEARANCE

CROSS-REFERENCE TO RELATED APPLICATIONS

This application is a continuation-in-part of each of: international application serial number PCT/US10/53695, filed Oct. 22, 2010 and titled PRINTED ARTICLE; and international application serial number PCT/US10/53699, filed Oct. 22, 2010 and titled PRINTED ARTICLES WITH OPTICALLY VARIABLE PROPERTIES. Each of the international applications designated the United States.

BACKGROUND

Inkjet technology has expanded its application to high-speed, commercial and industrial printing, in addition to home and office usage, because of its ability to produce economical, high quality, multi-colored prints. This technology is a non-impact printing method in which an electronic signal controls and directs droplets or a stream of ink that can be deposited on a wide variety of substrates. Current inkjet printing technology involves forcing the ink drops through small nozzles by thermal ejection, piezoelectric pressure or oscillation, onto the surface of a media.

As expanded colors and appearances are sought for home or office decorative printing, and for commercial package printing, developments have been made to provide inkjet prints and printed articles with specific features, such as for examples, metallic appearances or reflectivity. Printed articles with such specific features are noticeably limited among available options due, for example, to the cost or to the ineffectiveness for home and office use. Accordingly, investigations continue into developing media, ink and/or printed articles that exhibit specific properties such as, for example, metallic appearance.

BRIEF DESCRIPTION OF THE DRAWING

The drawings illustrate various embodiments of the present article and are part of the specification.

DETAILED DESCRIPTION

Figure 1:
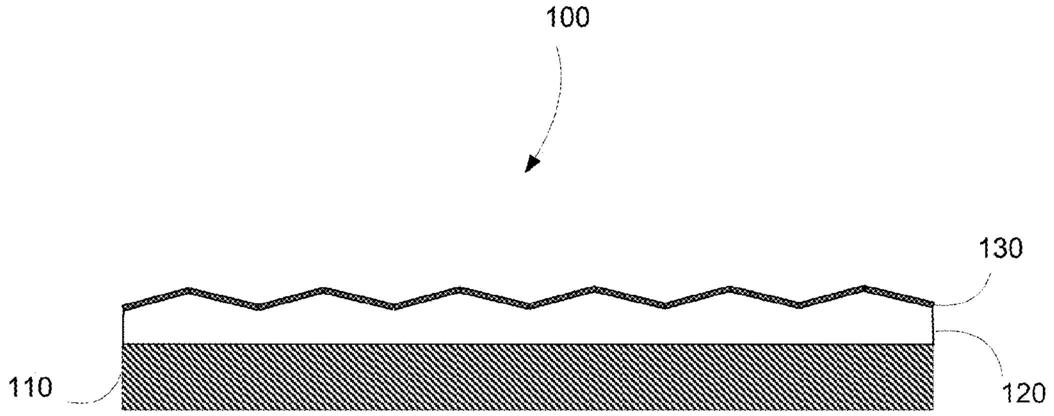
FIG. 1, FIG. 2, FIG. 3 and FIG. 4 are cross-sectional views of a printed article according to some embodiments of the present disclosure.

Before particular embodiments of the present disclosure are disclosed and described, it is to be understood that the present disclosure is not limited to the particular process and materials disclosed herein. It is also to be understood that the terminology used herein is used for describing particular embodiments only and is not intended to be limiting, as the scope of protection will be defined by the claims and equivalents thereof. In describing and claiming the present article and method, the following terminology will be used: the singular forms "a", "an", and "the" include plural referents unless the context clearly dictates otherwise. Thus, for example, reference to "a particle" includes reference to one or more of such materials. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For examples, a weight range of approximately 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc. All percents are by weight (wt %) unless otherwise indicated.

The present disclosure refers to a printed article with metallic appearance containing a printable media on which a printed feature is formed with an ink composition. Said ink composition encompasses a dispersion of metal or metal oxide particles having an average particle size in the range of about 3 nm to about 180 nm. Said media is a textured media containing a supporting substrate and an ink-absorbing layer with pore diameters that are smaller than the size of the metal or metal oxide particles.

In some examples, the printed article has a metallic luster and combines high metallic reflectivity with an enhanced print edge definition. Furthermore, the printed article has an optical reflectivity of a metal foil and has a shiny metallic appearance. The printed article exhibits also a sort of sparkling appearance from reflected light and has the tendency to reflect at specular angle when exposed to directional light source. By "metallic appearance", it is meant herein that the printed article has an opaque or a semi-opaque appearance and reflects the light as a metal reflects it (i.e. shows strong directional reflectivity of incident light). By "metallic luster", it is meant herein that the printed article has some characteristic of metals and that it exhibits some type of gloss, or sheen, that are often referred to as looking "metallic."

In some examples, the printed article contains printed features having specular reflectivity that is superior or, at least equal, to 10%. It means thus that it is able to reflect the light at a specular angle superior to about 10% of the incident light intensity. Without being linked by any theory, it is believed that the human perception of "metallic" of an object is related to ability of an observer to catch specular light reflection of directional light source coming off an object surface. The surface begins to looks metallic if it is able to reflect at specular angle more than, approximately, 10% of the incident light intensity (highly polished surface of true metals can reflect up to 85 to 95% of incident visible light). The higher is the intensity of the reflected light at specular angle (combined with low reflection off specular angle), the more metallic the appearance of the object surface.

The printed article contains a textured printable media on which a printed feature has been formed with a specific ink. Said ink composition, when applied onto the textured media, forms a uniform coating that exhibits metallic appearance. With application of the light onto said printed article, the angles of specular reflection are varying with textured topography. Such variations of the reflective angles create then multiple specular reflections off the print surface and create a sparkling metallic appearance.

The ink composition forms thus, on the textured printable media, a uniform coating with strong sparkling and metallic reflective appearance. In some examples, when iron oxide ($Fe_3O_4$) particles are used in the ink composition, the printed article exhibits a gold-like appearance. By "gold-like appearance", it is meant herein that the printed article has a visual appearance of gold-plated surface and has the color of metallic gold (Au). The printed article presents thus gloss, sheen and color as a gold object does.

The printed article, as disclosed herein, can be useful for forming printed images that have, for examples, decorative applications, such as greeting cards, scrapbooks, brochures, signboards, wall paper, business cards, certificates, packaging and other similar applications.

Figure 2:
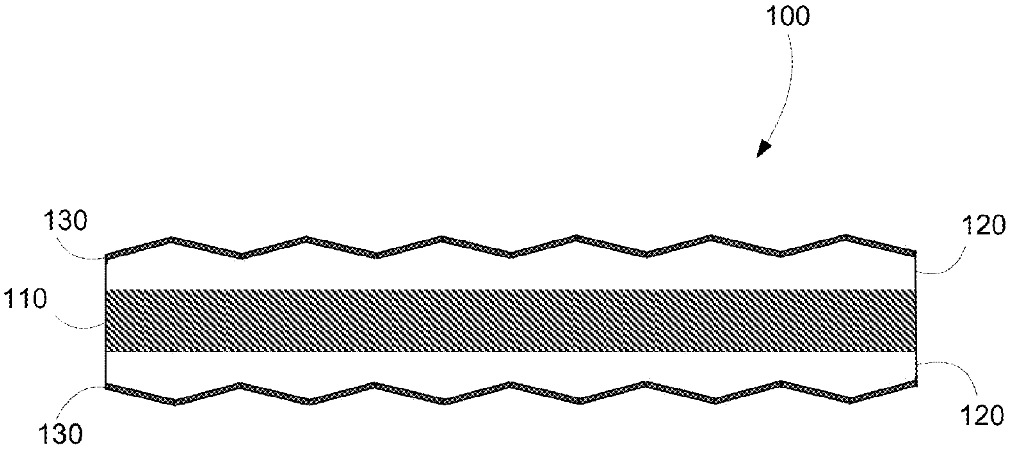

In some examples, such as illustrated in FIGS. 1 and 2, the printed article (100) contains a printed feature (130) and a textured printable media that encompasses an ink-absorbing layer (120) and a bottom supporting substrate (110). Such as illustrated in FIG. 1, the printed feature (130) and the ink-absorbing layer (120) are applied to only one side of the supporting substrate (110). If the coated side is used as an image-receiving side, the other side, i.e. backside, may not have any coating at all, or may be coated with other chemicals (e.g. sizing agents) or coatings to meet certain features such as to balance the curl of the final product or to improve sheet feeding in printer. Such as illustrated in FIG. 2, the printed feature (130) and the ink-absorbing layer (120) can be applied to both opposing sides of the supporting substrate (110).

Figure 3:
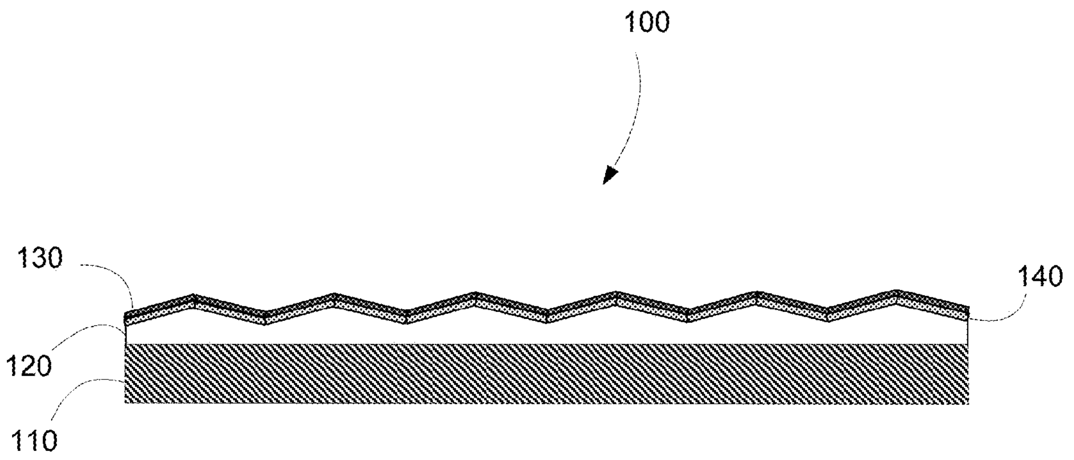
Figure 4:
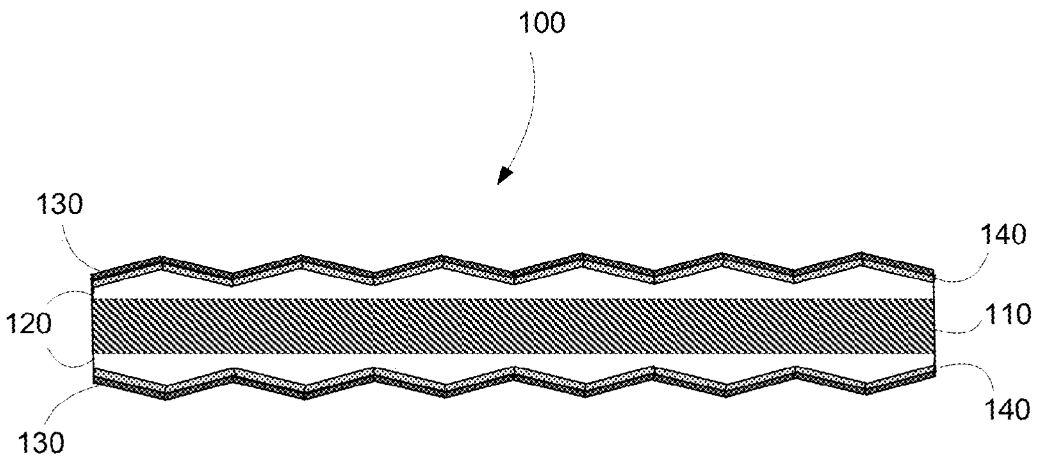
Figure 5:
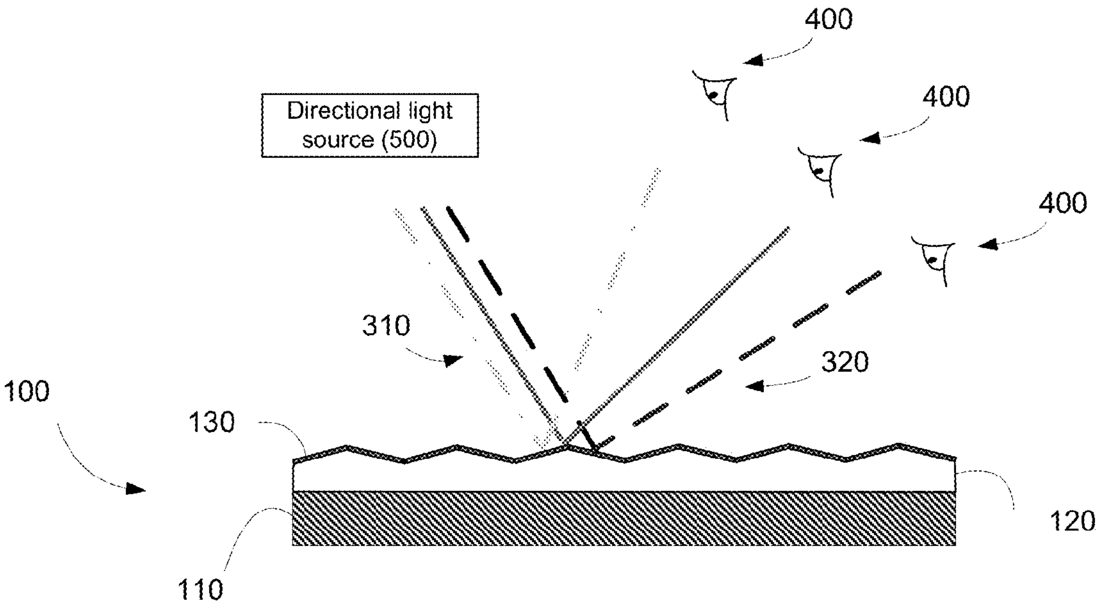
FIG. 5 is a drawing illustrating effects of light onto the printed article according to some embodiments of the present disclosure.

In some examples, as illustrated in FIGS. 3 and 4, the printed article (100) contains a printed feature (130) and a textured printable media that encompasses a supporting substrate (110), an ink-absorbing layer (120) applied to at least one surface of said substrate (110) and a glossy porous protective layer (140) applied over the ink-absorbing layer (120). The printed feature (130) is printed over the glossy porous protective layer (140). In some examples, such as illustrated in FIG. 3, the glossy porous protective layer (140) and the ink-absorbing layer (120) are applied to only one side of the supporting substrate (110). In some other examples, such as illustrated in FIG. 4, the printable media encompass a glossy porous protective layer (140) and an ink-absorbing layer (120) that are applied to both opposing sides of the supporting substrate (110). The printed feature (130) can thus be applied to both sides of the media. As illustrated in FIGS. 1, 2, 3 and 4, the printed article has a surface that is textured, which means thus that the ink-absorbing layer (120) and the glossy porous protective layer (140), when present, are embedded. In some embodiments, FIG. 5 illustrates the effect of light on the printed article (100) such as described herein. The incident light (310), originating form a directional light source (500), is applied to the printed article (100) and becomes reflected light (320). Said printed article (100), that encompasses a printed feature (130), an ink-absorbing layer (120) and a supporting substrate (110), reflect the incident light (310) onto a reflected light (320).

The printed article (100) has a textured reflective surface with variable specular reflection angles. Such surface has angles of specular reflection that are varying with texture topography. The variations of the reflective angles of the light (320) make possible for the observer (400) to see multiple specular reflections off the print surface at many viewing angles and without any major effort. These variations and multiple reflections are perceived as a "sparkle" effect and create an impression of enhanced metallic appearance. Such metallic appearance is visible from a multitude of viewing angles (up to +/−20-30° off specular direction). The printed article reduces thus viewing angle dependence of metallic appearance and makes the print surface look "metallic" at a wider viewing angle range. The textured printed article surface, illuminated by directional light source, is viewed as a pattern of highly contrasting light and dark areas. (The light areas are the spots on textured surface that are viewed at specular angle, while the dark ones are areas of the surface that are off specular angle). The combination of dark and light areas on the print creates a "sparkle" effect and enhances the metallic appearance of the print.

The printed article is thus a metallic luster article that is made on printable media with macroscopic surface texture and microscopic coating. The printable media is textured media. By textured media, it is meant herein a media that has been embedded and that presents a macroscopically textured surface. The textured surface is not smooth and has apparent physical features. Such features are macroscopic with sizes that are large enough to be seen by human eye (from normal viewing distance). The average size of textured features, on the media surface, can be superior to, at least, about 0.3 mm.

In some examples, the textured media is a media that has been embossed. Said embossed media is capable of retaining all of its inherent imaging and performance properties. The textured media can be obtained by embossing a pattern into media via passing said media between rollers with patterned surface. The technique for embossing a texture, pattern and/or design onto a media can involve molding the surface of a media by forcing it between a pressure nip formed by embossing rollers. The textured printable media can also be obtained by using embossing cylinders that may be mechanically or chemically etched with a specific pattern and/or design. The textured media can be created using an embossing roller under pressure. The media is altered during texturing by creating embossed depths ranging from about 5 μm to about 90 μm. The Parker Print Surface (PPS) roughness can vary from about 0.45 μm to about 7.5 μm at 1600 psi pressure on the embossing roll. The load and depth of pattern increase the surface roughness. The Zygo surface roughness increased from 0.23 Rq (rms) to 2.08 Rq (rms). The static coefficient of friction does not change but the kinetic coefficient of friction slightly decrease as the surface area is reduced.

In some alternative examples, the ink composition can be jetted onto a media in view of forming the printed article, said articled being, then, textured and/or embossed. Such embossed or textured printable media can correspond, non-exclusively, to papers of printing or writing categories, for texts and covers and art papers, for which a special paper texture is often sought.

The printed article (100) contains a printed feature (130) and a textured printable media that encompasses an ink-absorbing layer (120) and a bottom supporting substrate (110). In some examples, the media is a textured inkjet receptive micro-porous media. In some other examples, the printable media is a textured glossy porous inkjet photopapers.

The supporting substrate (110) of the textured printable media acts as a bottom substrate layer. The ink-absorbing layer (120) forms a coating layer on said supporting substrate (110) and, in other word, forms a recording material that is well adapted for inkjet printing device. The supporting substrate (110), which supports the ink-absorbing layer (120), may take the form of a sheet, a web, or a three-dimensional object of various shapes. The supporting substrate (110) can be of any type and size and can be any material that will be able to provide a mechanical support to the above-mentioned layers. In some examples, the supporting substrate is a flexible film or a rigid paper substrate. The supporting substrate (110) can be selected from cellulosic or synthetic paper (coated or uncoated), cardboard, polymeric film (e.g. plastic sheet like PET, polycarbonate, polyethylene, polypropylene), fabric, cloth and other textiles. The bottom substrate layer may also be a single material plastic film made from PET, polyimide or another suitable polymer film with adequate mechanical properties. In some examples, the supporting substrate (110) includes any substrate that is suitable for use in digital color imaging devices, such as electrophotographic and/or inkjet imaging devices, including, but in no way limiting to, resin coated papers (so-called photobase papers), papers, overhead projector plastics, coated papers, fabrics, art papers (e.g. water color paper), plastic film of any kind and the like. The substrate includes porous and non-porous surfaces. In some other examples, the supporting substrate (110) is paper (non-limitative examples of which include plain copy paper or papers having recycled fibers therein) or photopaper (non-limitative examples of which include polyethylene or polypropylene extruded on one or both sides of paper), and/or combinations thereof. In yet some other examples, the supporting substrate (110) of the textured media is a photobase. Photobase is a coated photographic paper, which includes a paper base extruded on one or both sides with polymers, such as polyethylene and polypropylene. Photobase support can include a photobase material including a highly sized paper extruded with a layer of polyethylene on both sides. In this regard, the photobase support is an opaque water-resistant material exhibiting qualities of silver halide paper. The photobase support can include a polyethylene layer having a thickness of about 10 to 24 grams per square meter (gsm). The photobase support can also be made of transparent or opaque photographic material. In some examples, the ink-absorbing layer (120) is disposed on the supporting substrate (110) and forms a coating layer having a coat weight that is in the range of about 10 to about 75 gram per square meter ($g/m^2$) per side. In some examples, the supporting substrate (110) has a thickness along substantially the entire length ranging between about 0.025 mm and about 0.5 mm.

The printable media (100) contains an ink-absorbing layer (120). This layer (120) is a porous ink-absorbing layer that can have a coat-weight in the range of about 10 to 40 $g/m^2$ or in the range of about 15 to about 30 $g/m^2$. Said ink-absorbing layer (120) has an absorption capacity (porosity) ranging from about 0.6 to about 1.2 liter/gram.

The ink-absorbing layer (120) is a porous layer having pore diameters that are smaller than the diameters of metal or metal oxide particles that are part of the ink composition applied to form the printed feature (130). The ink-receiving layer has a well developed surface porosity in order to efficiently drain the liquid phase of the ink off the surface and has thus enough volume porosity to absorb efficiently the ink liquid phase. In some examples, the ink-absorbing layer (120) is a porous layer having pore diameters in the range of about 1 to about 150 nm or in the range of about 3 to about 40 nm. The pore diameters are small enough to generate capillary pressure sufficient for compacting pigment particle cake on the surface of the media into an optically smooth highly reflective layer.

The ink-absorbing layer (120) can contain inorganic pigments in particulate form and at least one binder. Suitable inorganic pigments include metal oxides and/or semi-metal oxides particulates that may be independently selected from silica, alumina, boehmite, silicates (such as aluminum silicate, magnesium silicate, and the like), titania, zirconia, calcium carbonate, clays, or combinations thereof. In some examples, the inorganic pigments particulates are modified or unmodified fumed silica. If silica is used, it can be selected from the group of commercially available fumed silica: Cab-O-Sil®LM-150, Cab-O-Sil®M-5, Cab-O-Sil®MS-55, Cab-O-Sil®MS-75D, Cab-O-Sil®H-5, Cab-O-Sil®HS-5, Cab-O-Sil®H-5, Aerosil®150, Aerosil®200, Aerosil®300, Aerosil®350, and/or Aerosil®400. In some other examples, the inorganic particulate pigments are modified or unmodified alumina. The alumina coating can comprise pseudo-boehmite. Commercially available alumina particles can be used, including, but not limited to, Sasol Disperal®HP10, Disperal®HP14, boehmite, Cabot Cab-O-Sperse®PG003 and/or CabotSpectrAl®81 fumed alumina.

The inorganic pigments particulates can be from about 50 to about 300 nm in size. The Brunauer-Emmett-Teller (BET) surface area can be from about 100 to about 400 square meters per gram. The ink absorption layer can also contains fumed silica or fumed aluminas, which are aggregates of primary particles having an average particle size ranging from about 100 nm to about 250 nm. The amount of inorganic pigment may be from about 30 to about 90% by weight (wt %), or from about 60 to about 80 wt %, based on the total weight of the ink-absorbing layer.

A binder can be added to the ink-absorption layer (120) to bind the particulates together. The binders can be water-soluble polymers or polymer latexes. Examples of binders include, but are not limited to polyvinyl alcohols and water-soluble copolymers thereof, e.g., copolymers of polyvinyl alcohol and poly(ethylene oxide) or copolymers of polyvinyl alcohol and polyvinylamine; cationic polyvinyl alcohols; aceto-acetylated polyvinyl alcohols; polyvinyl acetates; polyvinyl pyrrolidones including copolymers of polyvinyl pyrrolidone and polyvinyl acetate; gelatin; silyl-modified polyvinyl alcohol; styrene-butadiene copolymer; acrylic polymer latexes; ethylene-vinyl acetate copolymers; polyurethane resin; polyester resin; and combination thereof. Examples of binders include Poval®235, Mowiol®56-88, Mowiol®40-88 (products of Kuraray and Clariant). In some examples, the binder may be present in an amount representing of about 5 wt % to about 30 wt % by total weight of the ink-absorbing layer (120).

In some embodiments, the printable media can include a glossy porous protective layer (140). Said glossy layer (140) can be applied over the ink-absorbing layer (120). In some examples, the glossy protective layer is a porous layer having pore diameters that are smaller than that the size of the metal or metal oxide particles of ink composition applied to form the printed feature (130). In some other examples, the glossy protective layer is a porous layer having pore diameters in the range of about 1 to about 150 nm or in the range of about 3 to about 20 nm. Without being linked by any theory, it is believed that this layer help to maximize the retention of metal oxide particles on the media surface, as well as to boost the specular reflectivity of the printed feature (130). The coat weight of the glossy protective layer (140) can be from about 0.1 $g/m^2$ to about 2 $g/m^2$ or can be from about 0.25 $g/m^2$ to about 1.0 $g/m^2$.

The glossy protective layer (140) can contain inorganic colloidal particles such as colloidal particulates of metal oxides and semi-metal oxides or colloidal silica particles and water-soluble binders, such as polyvinylalcohol or copolymers of vinylpyrrolidone. The particle size, as measured by diameter, of the inorganic colloidal particles can be from about 5 nm to about 150 nm. In some examples, the particle size is from about 20 nm to about 100 nm. The inorganic colloidal particles suitable for the glossy protective layer (140) are discrete, single particles and are not aggregates of primary particles. Inorganic colloidal particles can be selected from the group consisting of silica, aluminum, clay, kaolin, calcium carbonate, talc, titanium dioxide and zeolites. In some examples, the inorganic colloidal particles are colloidal silica particles. In some other examples, the porosity of the glossy porous layer is less than about 0.2 liter/gram. The glossy layer (140) can contain binders. Such binders can be polyvinylalcohol or copolymer of vinylpyrrolidone. The weight percentage of binder, based on the total dry weight of inorganic colloidal particles, can range from about 5 to about 12 wt %.

The printed article (100), such as defined herein, is a printable media on which a printed feature (130) is formed using printing technique. Such printing technique is, for example, an inkjet printing technique. The printed feature has been formed by application of a specific ink composition that contains metal or metal oxide particles having an average particle size in the range of about 3 to about 180 nm.

The ink composition forms thus onto the above-mentioned printable media, a printed feature (130) that can be considered as a metal coating. Said printed feature is, indeed, a uniform coating with strong sparkling and metallic reflective appearance. The printed feature (130) can have a thickness that is between about 40 and about 600 nm or that is between about 50 and about 400 nm. In some examples, the printed feature (130) has a density or, metal or metal oxide particles coverage, in the range about 3 to about 80 $\mu g/cm^2$ and, in some other examples, has a density in the range of about 4 to about 60 $\mu g/cm^2$.

The printed feature (130) is formed by application of a specific ink composition containing particles that are colloidal dispersions of metal nano-particles or that are based on a dispersion of metal oxide particles. Such metal and metal oxide particles have an average particle size in the range of about 3 to about 180 nm.

The ink compositions can be based on colloidal dispersions of metal nano-particles having particle size inferior to 150 nm. Such metal nano-particles can be selected from the group consisting of silver (Ag), chromium (Cr), nickel (Ni), gold (Au), cobalt (Co), copper (Cu), platinum (Pt), palladium (Pd), rhodium (Rh) and any alloys thereof. In some examples, said ink compositions are capable of forming printed feature films with reflectivity up to about 30-40%.

The ink compositions can also be based on dispersions of metal oxide particles. Such metal oxide particles have a mean particle size that is between 3 and 150 nm; in some other examples, that is between 5 and 100 nm, and, in yet other examples, that is between 5 and 80 nm. Metal oxide particles include metal oxide pigment selected from the group consisting of titanium dioxide ($TiO_2$), in rutile or anatase crystalline form, zinc oxide (ZnO), indium oxide ($In_2O_3$), manganese oxide ($Mn_3O_4$) and iron oxide ($Fe_3O_4$). In some examples, the metal oxide particles are iron oxide ($Fe_3O_4$) or manganese oxide ($Mn_3O_4$) particles.

Metal oxide particles might have a light absorptivity that is similar to that of metals. In some examples, when printed on textured media, inks based on dispersions of these materials may form coatings with reflectivity up to 20% (or even higher) and with a visual appearance of metallic films. When printed articles are made with an ink composition containing $Fe_3O_4$ particles, such printed articles may have visual appearance of gold.

The metal or metal oxide particles are dispersed in a liquid vehicle in view of forming an ink composition that is suitable for inkjet printing. In some examples, the ink composition is an inkjet ink composition that contains, at least, metal or metal oxide particles and an aqueous carrier. In some other examples, the ink composition contains a metal or metal oxide, a dispersant and a liquid vehicle. In some examples, the ink composition comprises a liquid vehicle and a dispersion of metal or metal oxide particles, said dispersion of particles represents from about 0.1 to about 25 wt % of the total weight of the ink composition. As used herein, "liquid vehicle" is defined to include any liquid composition that is used to carry the metal or metal oxide particles to the substrate. A wide variety of liquid vehicle components may be used herein. Such liquid vehicle may include a mixture of a variety of different agents, including without limitation, surfactants, solvent and co-solvents, buffers, biocides, viscosity modifiers and water. Organic solvents can be part of the liquid vehicle. Any suitable organic solvents can be used. Examples of suitable classes of organic solvents include polar solvents such as amides, esters, ketones, lactones and ethers. Examples of organic solvents also include N-methylpyrrolidone (NMP), dimethyl sulfoxide, sulfolane, and glycol ethers. The solvent can be used in an amount representing from about 0.1 to about 30 wt % of the ink composition or can be used in an amount representing from about 8 to about 25 wt % of the ink composition. The ink composition can include water. Such water can be used as the ink carrier for the composition and can be part of the liquid vehicle. The water can make up the balance of the ink composition, and may be present in an amount representing from about 40 to about 95% by weight of the total composition.

In addition to water, various types of agents may be employed in the ink composition to optimize the properties of the ink for specific applications. The ink composition may also include any number of buffering agents and/or biocides. Surfactants can also be used and may include water-soluble surfactants such as alkyl polyethylene oxides, alkyl phenyl polyethylene oxides, polyethylene oxide (PEO) block copolymers, acetylenic PEO, PEO esters, PEO amines, PEO amides, dimethicone copolyols, ethoxylated surfactants, fluorosurfactants, and mixtures thereof.

In some examples, the metal or metal oxide particles, present in the ink composition, are dispersed with dispersants. Examples of suitable dispersants include, but are not limited to, water-soluble anionic species of low and high molecular weight such as phosphates and polyphosphates, carboxylates (such as oleic acid), polycarboxylates (such as acrylates and methacrylates). Other examples include hydrolysable alkoxysilanes with alkoxy group attached to water-soluble (hydrophilic) moieties such as water-soluble polyether oligomer chains.

The dispersant can be reactive silane coupling agents containing hydrophilic functional groups, such as amino, diamino, triamino, ureido, poly(ether), mercapto, glycidol functional groups and their hydrolysis product. Examples of silane coupling agents suitable as dispersants for metal or metal oxide particles are (aminoethyl)aminopropyl-triethoxysilane, (aminoethyl)aminopropyl-trimethoxysilane, (aminoethyl)aminopropyl-methyldimethoxysilane, aminopropyl-triethoxysilane, aminopropyl-trimethoxysilane, glycidolpropyl-trimethoxysilane, ureidopropyltrimethoxysilane and polyether-triethoxysilane, polyether-trimethoxysilane hydrolysis product of aminopropyl-trimethoxysilane and hydrolysis product of (aminoethyl)aminopropyl-trimethoxysilane. In some examples, the dispersants used to disperse metal or metal oxide particles of the ink composition, are polyether alkoxysilane dispersants.

Examples of suitable polyether alkoxysilanes include $HO(CH_2CH_2O)_{n'}$—$Si(OCH_3)_3$; HO—$(CH_2CH_2O)_{n'}$—$Si(OCH_2CH_3)_3$; $CH_3O$—$(CH_2CH_2O)_{n'}$—$Si(OCH_3)_3$; $CH_3O(CH_2CH_2O)_{n'}$—$Si(OCH_2CH_3)_3$; $C_2H_5O$—$(CH_2CH_2O)_{n'}$—$Si(OCH_3)_3$; $C_2H_5O$—$(CH_2CH_2O)_{n'}$—$Si(OCH_2CH_3)_3$; HO—$(CH_2CH(CH_3)O)_{n'}$—$Si(OCH_3)_3$; HO—$(CH_2CH(CH_3)O)_{n'}$—$Si(OCH_2CH_3)_3$; $CH_3O(CH_2CH(CH_3)O)_{n'}$—$Si(OCH_3)_3$; $CH_3O$—$(CH_2CH(CH_3)O)_{n'}$—$Si(OCH_2CH_3)_3$; $CH_3O$—$(CH_2CH_2O)_{n'}$—$Si(CH_3)(OCH_3)_2$; $CH_3O$—$(CH_2CH_2O)_{n'}$—$Si(CH_3)_2(OCH_3)$; $CH_3O(CH_2CH_2O)_{n'}$—$Si(CH_3)(OC_2H_5)_2$; $CH_3O(CH_2CH_2O)_{n'}$—$Si(CH_3)_2(OC_2H_5)$ wherein n' is an integer equal to 2 or greater. In some examples, n' is an integer ranging from 2 to 30 and, in some other examples, n' is an integer ranging from 5 to 15. Commercial examples of the polyether alkoxysilane dispersants include, but are not limited to, Silquest®A-1230 manufactured by Momentive Performance Materials, and Dynasylan®4144 manufactured by Evonik/Degussa.

The amount of dispersant used in the dispersions may vary from about 1 wt % to about 300 wt % of the dispersed metal or metal oxide particles content. In some examples, the dispersant content range is between about 2 and about 150 wt %, or, in some other examples, is between about 5 and about 100 wt % of the metal or metal oxides particles content.

The ink composition, containing a liquid phase and metal or metal oxide particles, is applied onto a textured printable media containing a bottom supporting substrate (130), an ink-absorbing layer (120) and, optionally, a porous glossy layer (140). Said ink-absorbing layer (120) and glossy layer (140) have pore diameters smaller than the size of the metal or metal oxide pigment particles. The liquid phase of the ink composition penetrates through the pores of the glossy layer (140), when present, and further into the ink-absorbing layer (120). The metal particles cannot penetrate through the surface pores and are retained on top of the media. Without being linked by any theory, it is believed that the combination of small pore size and high absorbing capacity of the layers helps to develop a significant capillary pressure (from about 200 or 300 psi up to about 1000 or 2000 psi as calculated by Young-Laplace equation). The capillary pressure compacts the metal particles deposited on the printable media and results in a flat, dense film of metal particles that helps to form the printed features (130). Said media has thus a multilayered structure and is capable of producing a printed feature that exhibits a metalized aspect when being printed with the above described ink formulation.

In some embodiments, a method for forming a printed article with metallic appearance encompasses: providing an ink composition that contains a dispersion of metal or metal oxide particles having an average particle size in the range of about 3 to about 180 nm; providing a textured printable media, which contains a bottom supporting substrate and an ink-absorbing layer with pore diameters smaller than the size of the metal or metal oxide pigment particles; and jetting said ink composition onto said printable media to form a printed feature with metallic appearance. In some examples, the printable media encompasses, in addition, a glossy porous protective layer (140) with pore diameters that are smaller than that of the pigment particles of ink composition applied to form the printed feature (130).

The projection of the stream of droplets of ink composition, onto the printable media, can be done via any suitable inkjet printing technique. Non-limitative examples of inkjet printing technique include thermal, acoustic, continuous and piezoelectric inkjet printing. In some examples, the ink composition, containing metal or metal oxide particles that have an average particle size in the range of about 3 to about 180 nm, is ejected from an inkjet printhead (piezo or thermal) onto the printable media. After jetting, the particles of the ink composition aggregate on the media surface of the printable substrate and form a layer of desired reflectivity and appearance.

The preceding description has been presented only to illustrate and describe exemplary embodiments of the disclosure. However, it is to be understood that the following are only exemplary or illustrative of the application of the principles of the present print media and methods.

EXAMPLES

A printed article with metallic appearance is made by applying an ink composition containing a dispersion of metal oxide particles onto the surface of a textured printable media by means of a thermal inkjet printhead.

The ink composition is prepared using $Fe_3O_4$ particles dispersion. The dispersion is based on a mix of metal oxide nanoparticle ($Fe_3O_4$ powder available from Sigma-Aldrich) with a dispersant (Silquest®A-1230 available from Momentive Performance Materials) at dispersant/metal oxide particles ratio equal to about 0.5. The dispersion contains about 6 wt % of metal oxide particles ($Fe_3O_4$). The average particle size of $Fe_3O_4$ particles is 22 nm (as measured by "Nanotrack" particle size analyzer). The ink formulation is illustrated in the table (a) below. All percentages are expressed in wt % of the total composition.

TABLE (a)

| Ink formulation | Wt % |
|---|---|
| $Fe_3O_4$ dispersion | 33.2 |
| LEG-1 | 5.0 |
| 2-Pyrrolidinone | 9.0 |
| Trizma ® Base | 0.2 |
| Proxel ® GXL | 0.1 |
| Surfynol ® 465 | 0.2 |
| Water | Up to 100% |

LEG-1 is a co-solvent available from Liponics. Trizma Base is available from Sigma Aldrich Inc. Proxel®GXL is a biocide available from Avecia Inc. Surfynol®465 is a surfactant available from Air Products.

Textured printable media are prepared by applying an ink-absorbing layer and, eventually, a glossy layer, onto a photobase as supporting substrate (HP Advanced photopaper, 166 or 171 g/m$^2$ raw base paper). The ink-absorbing layer is applied first to the front side of the photopaper with a roller coater. When present, the glossy layer is coated on the top of the ink-absorbing layer. The coat weight of the ink-absorbing layer is from about 10 to about 40 gsm and the coat weight of the glossy layer is from about 0.1 to about 2 gsm. The formulations of the different coating layers are expressed in the Table (b) below. Each number represent the part per weight of each components present in each layer.

TABLE (b)

| Layer | Ingredients | Media A | Media B |
|---|---|---|---|
| Glossy protective layer | Disperal ® HP-14 | 75 | — |
| | Cartacoat ® K303C | 25 | — |
| | PVA 2 | 11 | — |
| Coat-weight | | 0.5 gsm | — |
| ink-absorbing layer | Treated Silica | 100 | 100 |
| | PVA 1 | 21 | 21 |
| | Boric Acid | 2.5 | 2.5 |
| | Silwet ® L-7600 | 0.5 | 0.5 |
| | Glycerol | 1.5 | 1.5 |
| | Zonyl ® FSN | 0.1 | 0.1 |
| Coat-weight | | 28 gsm | 28 gsm |

Treated silica is Cab-O-Sil®MS-55 (available from Cabot) treated with ACH and Silquest®A-1110. PVA 1 is Poval®235 available from Kuraray. PVA 2 is Mowiol®40-88 available from Kuraray. Zonyl®FSN is a fluorosurfactants available from DuPont Inc. Cartacoat®K303C is cationic colloidal silica available from Clariant. Disperal®HP-14 is boehmites available from Sasol technologies Inc. Silwet®L-7600 is a surfactant from GE silicone Inc.

The coated media A and B, in a web form, are subjected to a patterned roller under pressure. The pattern is then transferred to the coating primarily. The patterns of coated media A and B look like leather. (If the pressure is high enough and the backing roll has the female shape of the patterned roll then both sides of the media will look like leather. If less pressure and no backing roll texture then only the coating will have the leather texture).

The ink, such as described in Table (a), is printed on the media A and on the media B as described in Table (b), using a HP Black Print Cartridge 94, in a HP Photosmart 8450 printer. The resulting printed articles present a shiny metallic appearance and a sparkling effect to the observer.

The invention claimed is:

1. A printed article with metallic appearance comprising a printable media on which a printed feature is formed with an ink composition, wherein said ink composition comprises a dispersion of metal or metal oxide particles having an average particle size in the range of about 3 to about 180 nm; and wherein said media is a textured media containing a supporting substrate and an ink-absorbing layer with pore diameters smaller than the size of the metal or metal oxide particles.

2. The printed article, according to claim 1, wherein the ink composition forms, onto the textured media, a printed feature with a thickness in the range of about 40 nm to about 600 nm.

3. The printed article, according to claim 1, wherein the ink composition forms onto the textured media a printed feature with a metal or metal oxide particles coverage in the range of about 3 to about 80 $\mu g/cm^2$.

4. The printed article, according to claim 1, wherein the textured media further comprises a glossy porous protective layer that is applied over the ink-absorbing layer.

5. The printed article, according to claim 1, wherein the supporting substrate of the textured media is a photobase.

6. The printed article, according to claim 1, wherein the printable media is a textured glossy porous inkjet photopaper.

7. The printed article, according to claim 1, wherein the particles, present in the ink composition, are metal oxide particles selected from the group consisting of titanium dioxide ($TiO_2$), zinc oxide (ZnO), indium oxide ($In_2O_3$), manganese oxide ($Mn_3O_4$) and iron oxide ($Fe_3O_4$).

8. The printed article, according to claim 1, wherein the particles, present in the ink composition, are manganese oxide ($Mn_3O_4$) or iron oxide ($Fe_3O_4$) particles.

9. The printed article, according to claim 1, wherein the ink composition comprises a liquid vehicle and a dispersion of metal or metal oxide particles, said dispersion of particles representing from about 0.1 to about 25 wt % of the total weight of the ink composition.

10. The printed article, according to claim 1, wherein the metal or metal oxide particles, present in the ink composition, are dispersed with polyether alkoxysilanes dispersants.

11. A method for forming a printed article with metallic appearance comprising:

a. providing an ink composition containing a dispersion of metal or metal oxide particles having an average particle size in the range of about 3 to about 180 nm;

b. providing a textured printable media containing a bottom supporting substrate and an ink-absorbing layer with pore diameters smaller than the size of the metal or metal oxide particles;

c. and jetting said ink composition onto said textured printable media.

12. The method for forming a printed article, according to claim 11, wherein the textured media further comprises a glossy porous protective layer that is applied over the ink-absorbing layer.

13. The method for forming a printed article, according to claim 11, wherein the textured media is a textured glossy porous inkjet photopaper.

14. The method for forming a printed article, according to claim 11, wherein the particles present in the ink composition are manganese oxide ($Mn_3O_4$) or iron oxide ($Fe_3O_4$) particles.

15. The method for forming a printed article, according to claim 11, wherein the ink composition is applied onto the textured printable media via inkjet printing technique.

* * * * *